(12) United States Patent
Gingras et al.

(10) Patent No.: US 7,664,028 B1
(45) Date of Patent: Feb. 16, 2010

(54) APPARATUS AND METHOD FOR METERING AND MARKING DATA IN A COMMUNICATION SYSTEM

(75) Inventors: Sylvain Gingras, Montreal (CA); Scott Reynolds, Vancouver (CA)

(73) Assignee: PMC-Sierra Ltd., Burnaby (CA)

(*) Notice: Subject to any disclaimer, the term of this patent is extended or adjusted under 35 U.S.C. 154(b) by 1372 days.

(21) Appl. No.: 10/093,092

(22) Filed: Mar. 5, 2002

Related U.S. Application Data

(60) Provisional application No. 60/273,564, filed on Mar. 5, 2001.

(51) Int. Cl.
    H04L 12/26 (2006.01)
(52) U.S. Cl. .................. 370/235; 370/229; 370/230; 370/231; 370/232; 370/235.1; 370/236; 370/450; 370/466; 370/467; 379/1.01; 379/24; 379/28; 379/32.01; 709/232
(58) Field of Classification Search .......... 370/253, 370/235.1, 229, 230, 231, 232, 235, 236, 370/450, 466, 467; 379/1.01, 24, 28, 32.01; 709/232
See application file for complete search history.

(56) References Cited

U.S. PATENT DOCUMENTS

| | | | |
|---|---|---|---|
| 5,835,711 A * | 11/1998 | Chang et al. ............... | 709/232 |
| 6,052,379 A * | 4/2000 | Iverson et al. ............... | 370/442 |
| 6,108,303 A | 8/2000 | Fahmi et al. | |
| 6,587,466 B1 * | 7/2003 | Bhattacharya et al. .. | 370/395.21 |
| 6,650,644 B1 * | 11/2003 | Colley et al. ............ | 370/395.21 |
| 6,904,015 B1 * | 6/2005 | Chen et al. ................. | 370/235 |
| 6,914,883 B2 * | 7/2005 | Dharanikota ............. | 370/230.1 |
| 6,937,561 B2 * | 8/2005 | Chiussi et al. ............. | 370/229 |
| 7,046,680 B1 * | 5/2006 | McDysan et al. .......... | 370/396 |
| 7,193,968 B1 * | 3/2007 | Kapoor et al. ............. | 370/235 |
| 2002/0196796 A1 * | 12/2002 | Ambe et al. ................ | 370/401 |
| 2003/0086140 A1 * | 5/2003 | Thomas et al. ............. | 359/167 |

OTHER PUBLICATIONS

Blake et al. (1998) "An Architecture for Differentiated Services." *The Internet Society* pp. 1-43 ; ftp://ftp.isi.edu/in-notes/rfc2475.txt.
Heinenen et al. (1999) "A Two Rate Three Color Marker." *The Internet Society* pp. 1-6; http://www.ietf.org/rfc/rfc2698.txt?number=2698.
Heinenen et al. (1999) "A Single Rate Three Color Marker." *The Internet Society* pp. 1-8; http:// www.ietf.org/rfc/rfc2697.txt?number=2697.

* cited by examiner

*Primary Examiner*—William Trost, IV
*Assistant Examiner*—Toan D Nguyen
(74) *Attorney, Agent, or Firm*—Quine Intellectual Property Law Group; Stephen J. LeBlanc

(57) ABSTRACT

A system and/or method for metering and marking packets of data incoming into a communication system having in some embodiments primary and secondary meter selectors, primary and secondary metering processors and a pipeline and wrapper interface controller. Further methods involve measuring an incoming microflow against one or two specified temporal profiles using a two-level metering hierarchy.

40 Claims, 14 Drawing Sheets

HIERARCHICAL PACKET METERING

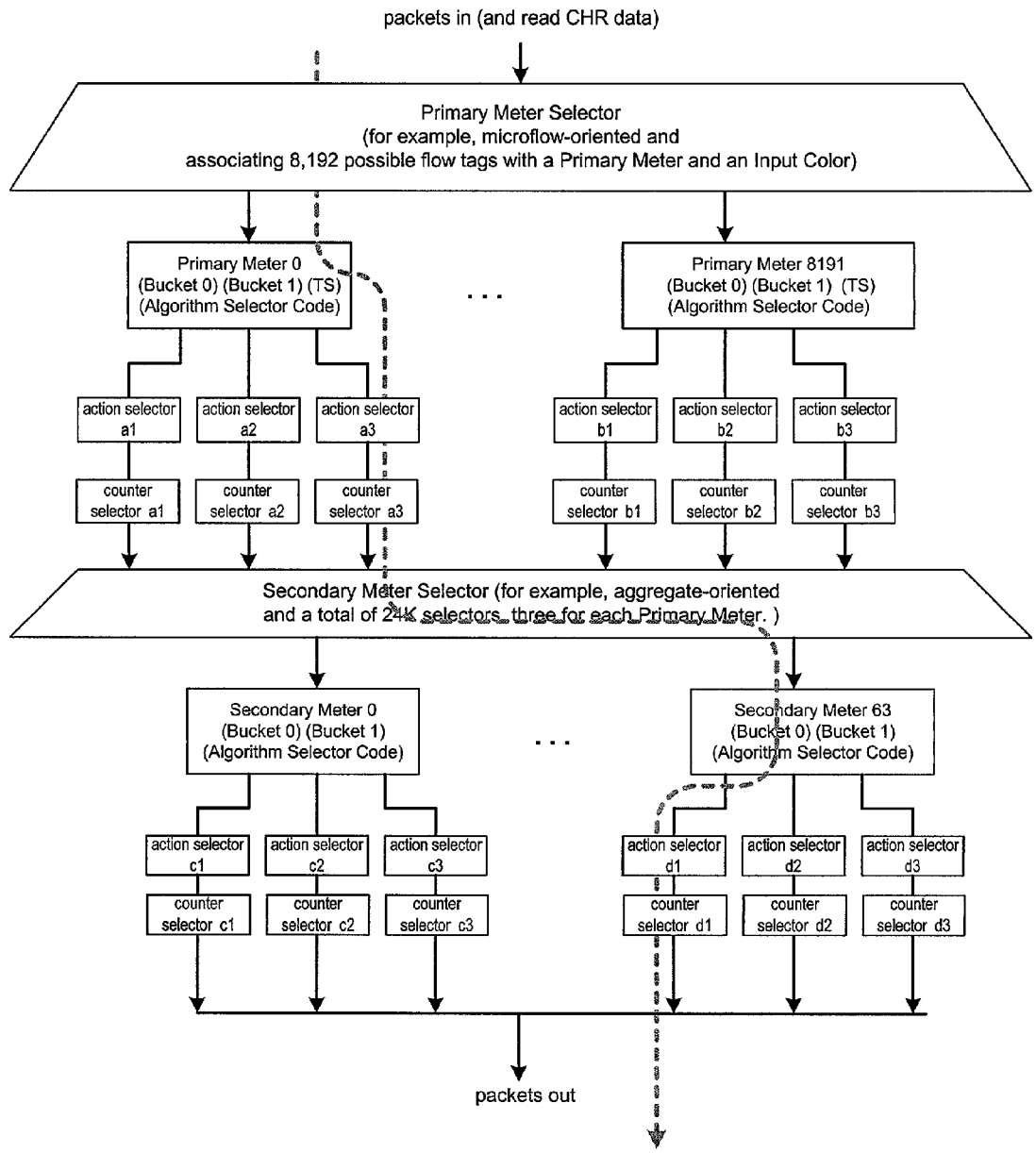
FIGURE 1 HIERARCHICAL PACKET METERING

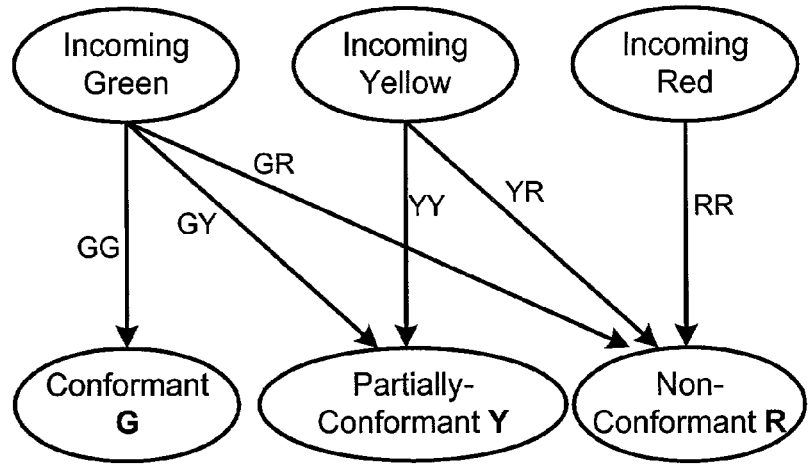
FIGURE 2 THREE COLOR METERING OUTCOMES
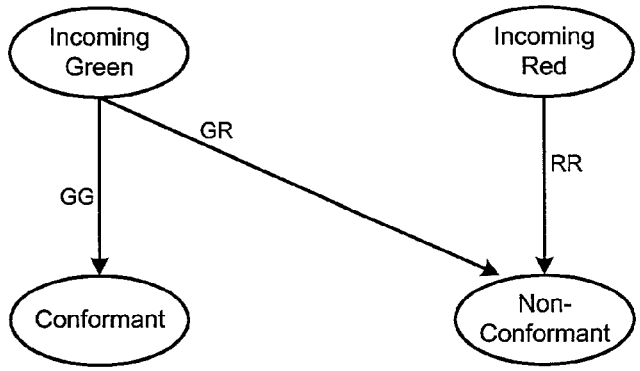
FIGURE 3 TWO COLOR METERING OUTCOMES

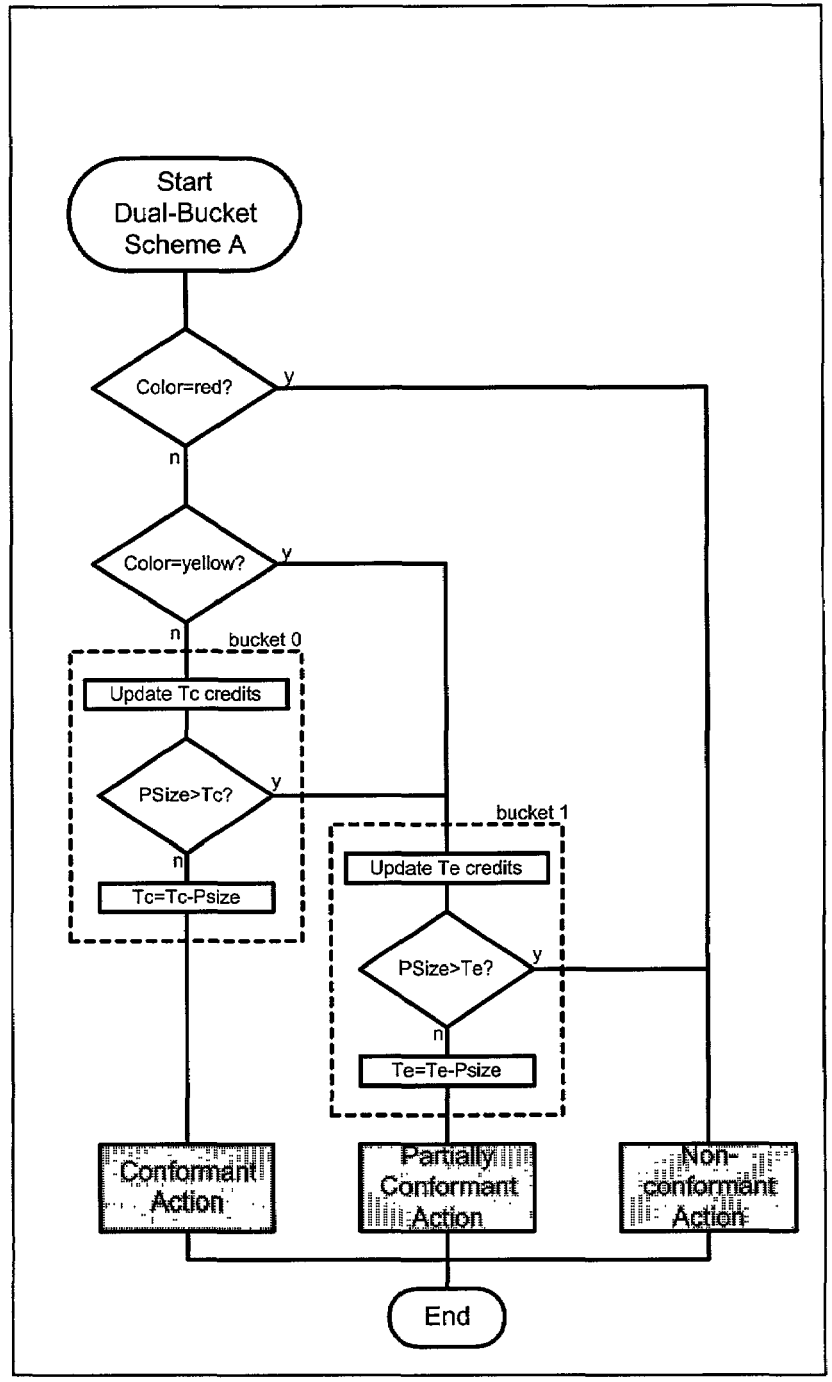
FIGURE 4 SINGLE RATE DUAL-BUCKET METERING

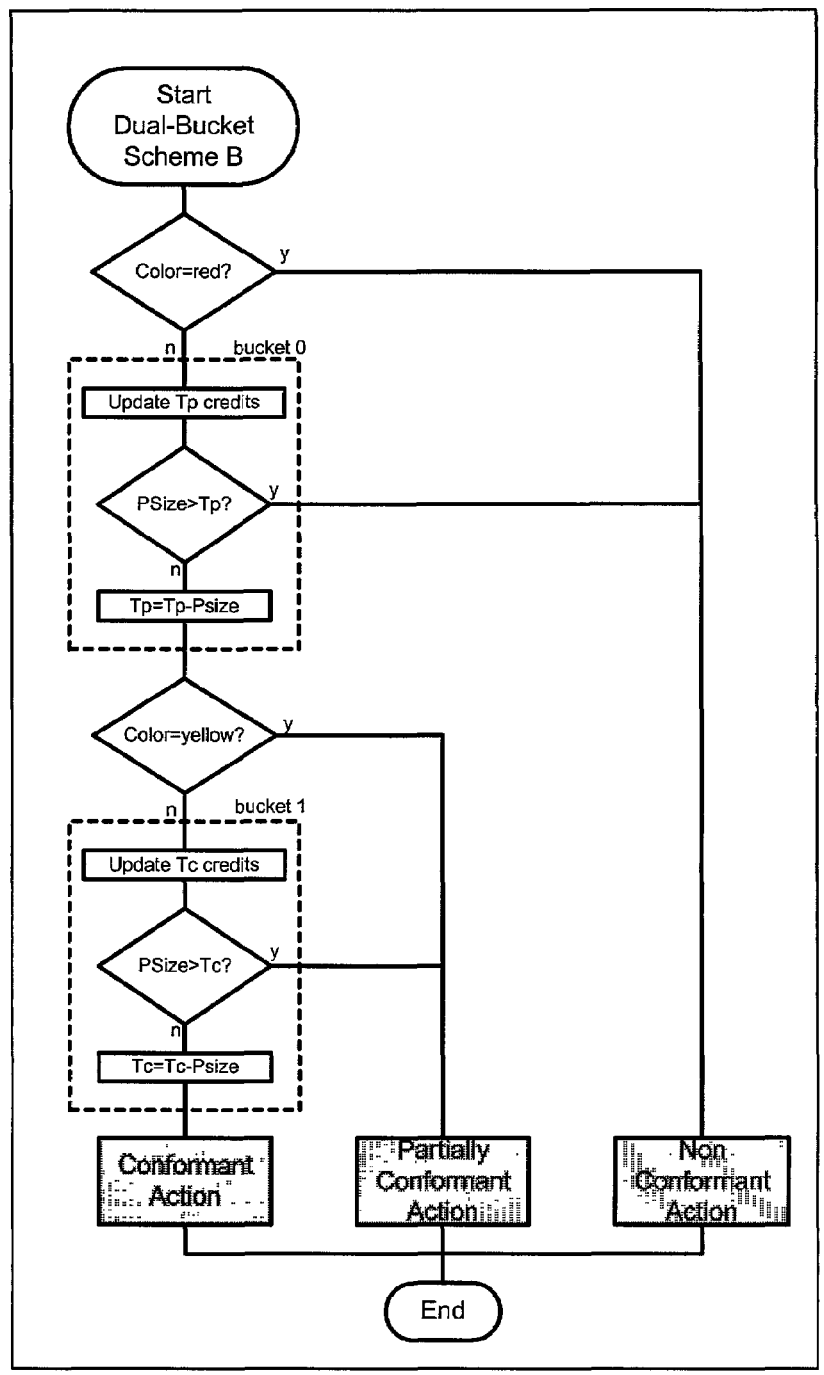
FIGURE 5 TWO RATE DUAL BUCKET ALGORITHM

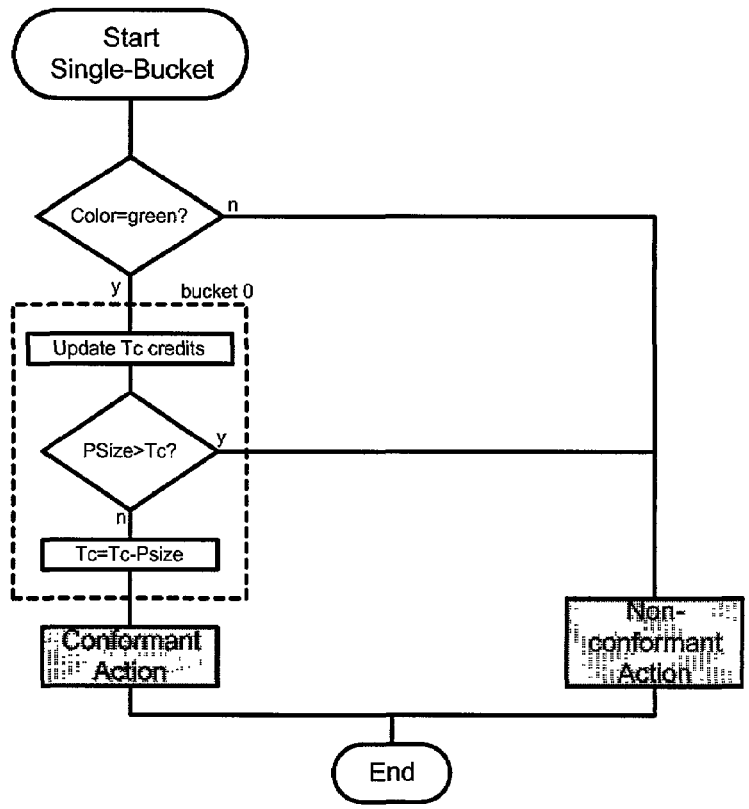
FIGURE 6   SINGLE BUCKET ALGORITHM
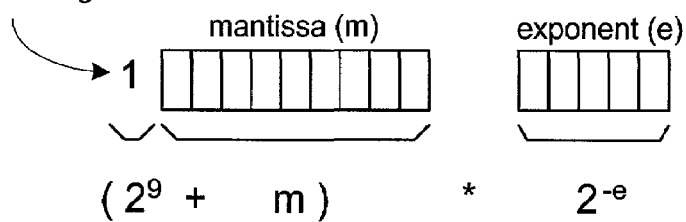
$$(2^9 + m) * 2^{-e}$$
FIGURE 7   FLOATING POINT RATE REPRESENTATION

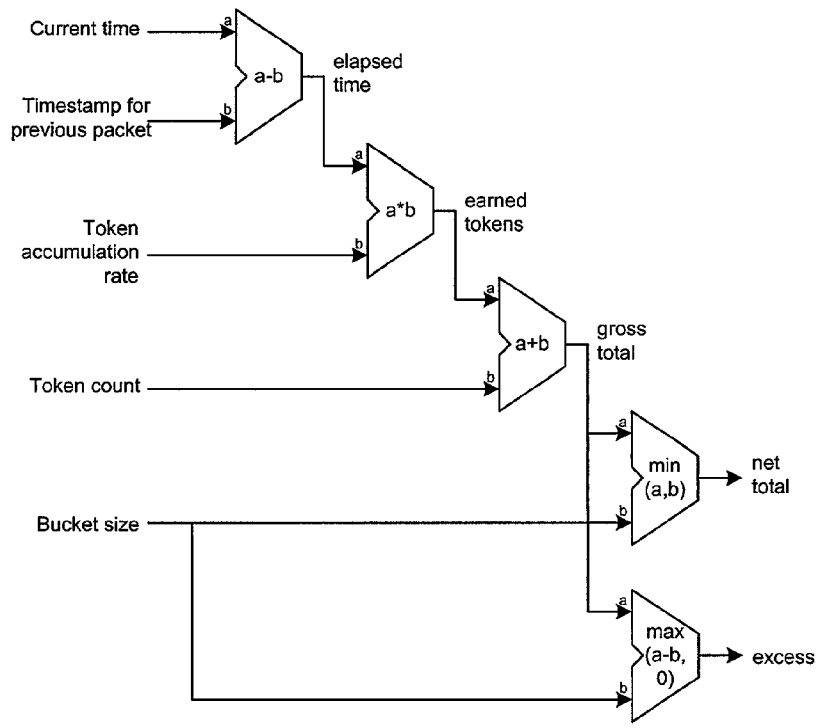
FIGURE 8   UPDATING TOKEN COUNTS
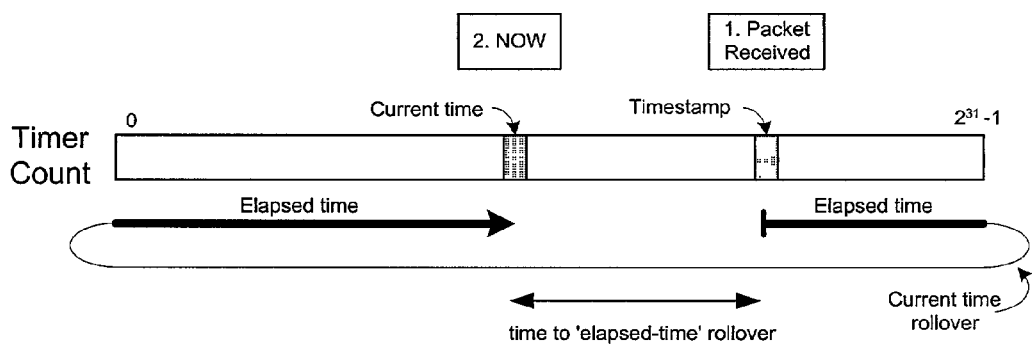
FIGURE 9   COMPUTING THE ELAPSED TIME

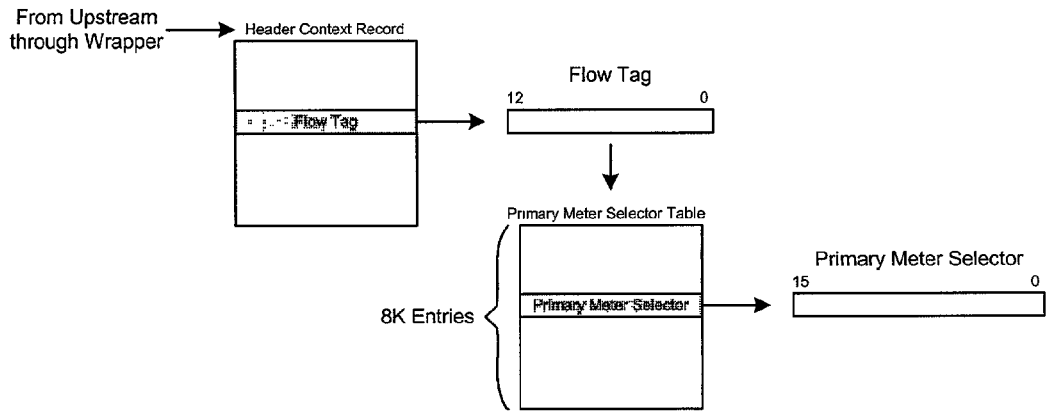
FIGURE 10   SELECTING THE PRIMARY METER SELECTOR
FIGURE 11   PRIMARY METER SELECTOR FORMAT
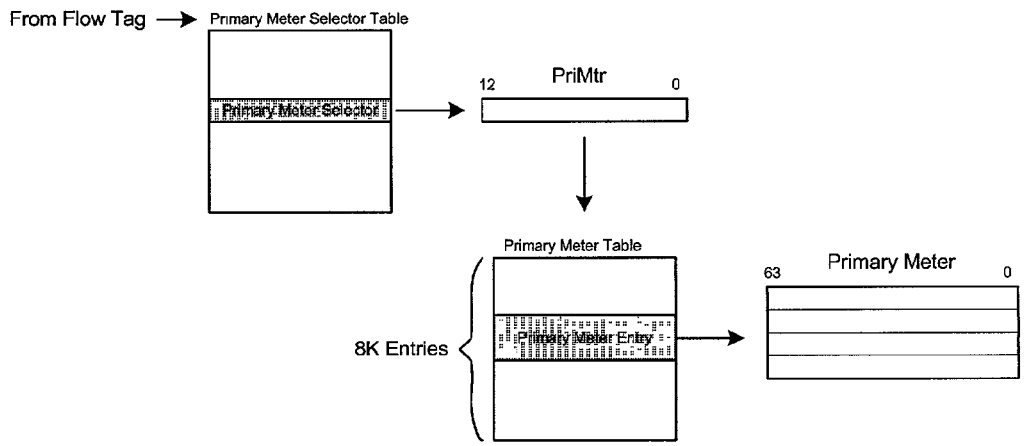
FIGURE 12   SELECTING THE PRIMARY METER

| | Bits 31-16 | | | Bits 15-0 | | |
|---|---|---|---|---|---|---|
| Word 0 | [31:28]<br>Algo [3:0] | [27:14]<br>B0_Rate [13:0] | | [13:0]<br>B1_Rate [13:0] | | |
| Word 1 | [31]<br>Saturate | [30:0]<br>Tstamp [30:0] | | | | |
| Word 2 | [31:16]<br>B0_TCH [15:0] | | | [15:0]<br>B1_TCH [15:0] | | |
| Word 3 | [31:24]<br>PrtyH [7:0] | [23:20]<br>B0_BSL[3:0] | [19:16]<br>B0_TCL[3:0] | [15:8]<br>PrtyL [7:0] | [7:4]<br>B1_BSL[3:0] | [3:0]<br>B1_TCL[3:0] |
| Word 4 | [31:16]<br>B0_BSH [15:0] | | | [15:0]<br>B1_BSH [15:0] | | |
| Word 5 | [31:23]<br>C_SMS [8:0] | | [22:0]<br>C_Action [22:0] | | | |
| Word 6 | [31:23]<br>PC_SMS [8:0] | | [22:0]<br>PC_Action [22:0] | | | |
| Word 7 | [31:23]<br>NC_SMS [8:0] | | [22:0]<br>NC_Action [22:0] | | | |
FIGURE 13   PRIMARY METER FORMAT
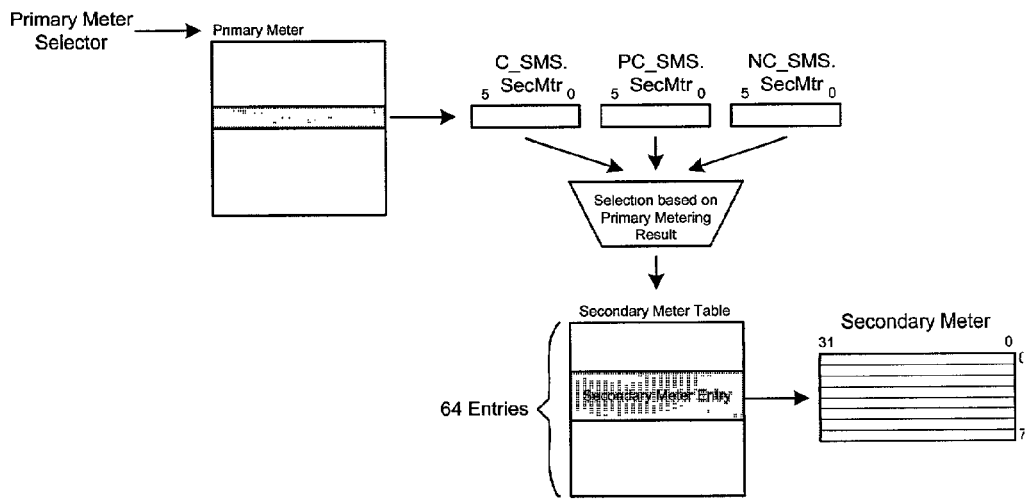
FIGURE 14   SELECTING THE SECONDARY METER

|  | Bits 31-16 | | | Bits 15-0 | | |
|---|---|---|---|---|---|---|
| Word 0 | [31:28]<br>Algo [3:0] | [27:14]<br>B0_Rate [13:0] | | [13:0]<br>B1_Rate [13:0] | | |
| Word 1 | [31]<br>Saturate | [30:0]<br>Tstamp [30:0] | | | | |
| Word 2 | [31:16]<br>B0_TCH [15:0] | | | [15:0]<br>B1_TCH [15:0] | | |
| Word 3 | [31:24]<br>PrtyH [7:0] | [23:20]<br>B0_BSL[3:0] | [19:16]<br>B0_TCL[3:0] | [15:8]<br>PrtyL [7:0] | [7:4]<br>B1_BSL[3:0] | [3:0]<br>B1_TCL[3:0] |
| Word 4 | [31:16]<br>B0_BSH [15:0] | | | [15:0]<br>B1_BSH [15:0] | | |
| Word 5 | [31:23]<br>Rsvd [8:0] | [22:0]<br>C_Action [22:0] | | | | |
| Word 6 | [31:23]<br>Rsvd [8:0] | [22:0]<br>PC_Action [22:0] | | | | |
| Word 7 | [31:23]<br>Rsvd [8:0] | [22:0]<br>NC_Action [22:0] | | | | |

FIGURE 15  SECONDARY METER FORMAT

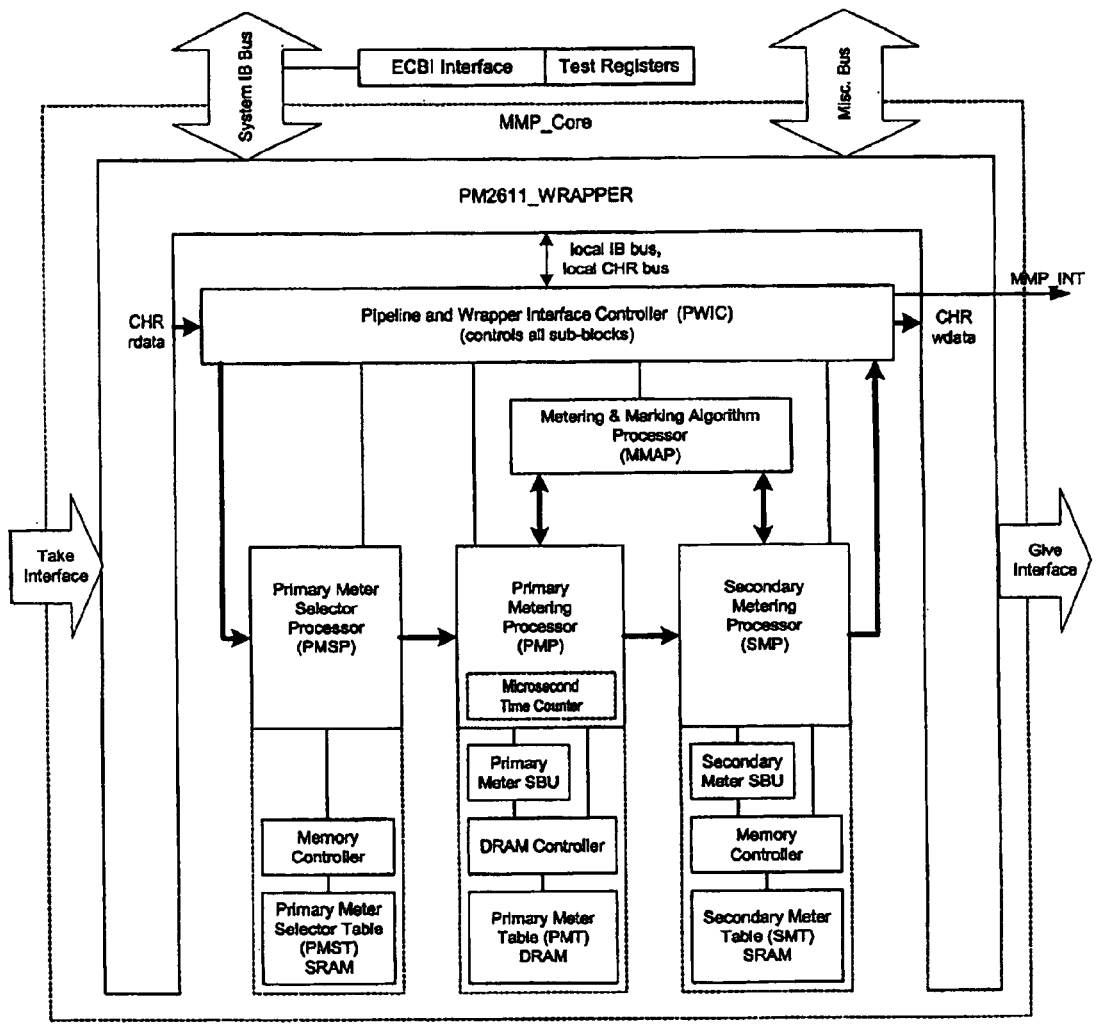
FIGURE 16 EXAMPLE WRAPPER IMPLEMENTATION

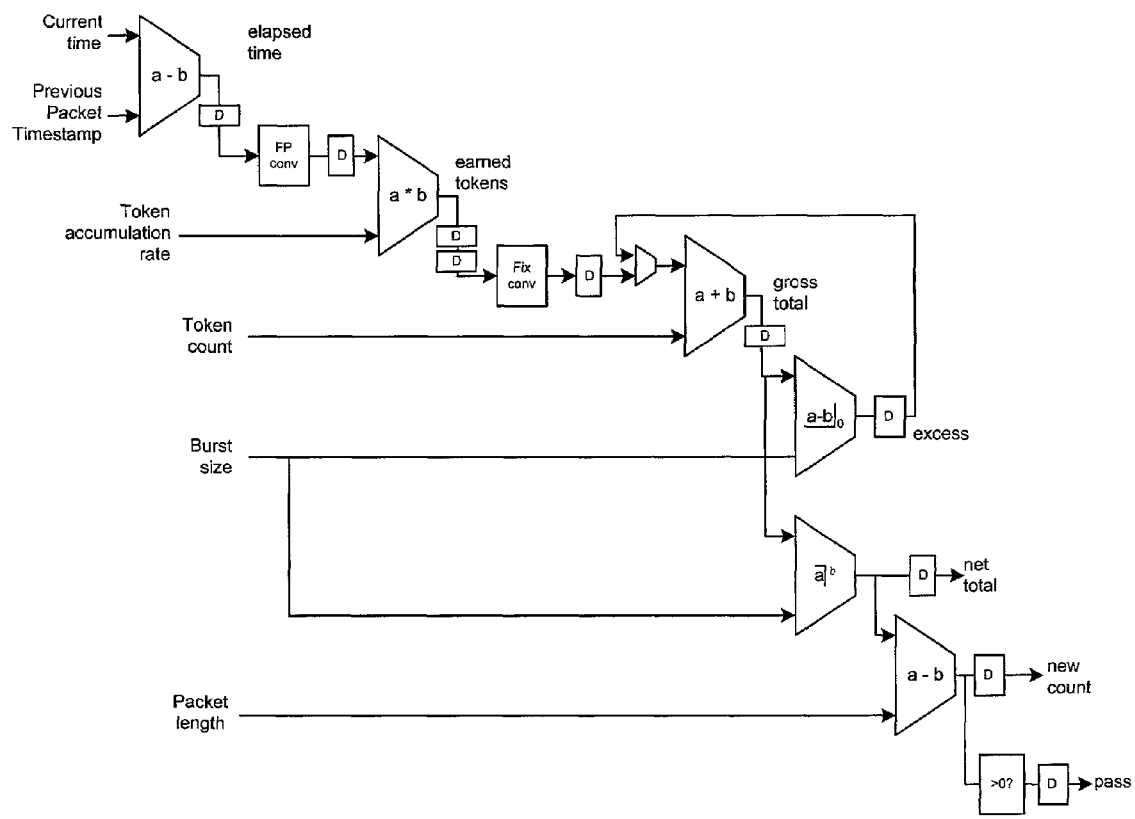
FIGURE 17   ARITHMETIC PIPELINE FOR MMAP

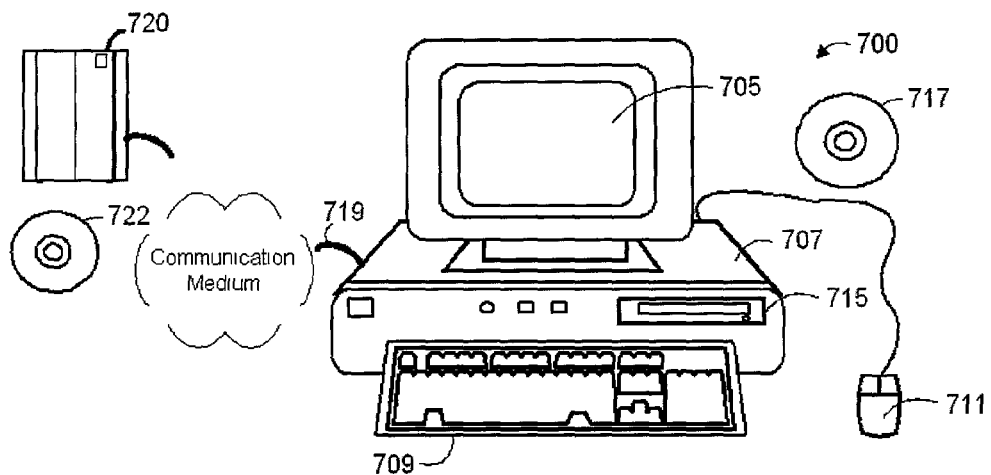
FIGURE 18   EXAMPLE LOGIC SYSTEM

| Segment | CHR Bus | PMST | PMT | MMAP | SMT |
|---|---|---|---|---|---|
| 0 | | Host Access | Write for C | Primary for D | Read for C |
| 1 | Read for A | Read for A | Write for D | Secondary for C | Read for D |
| 2 | Read for B / Write for C | Read for B | Read for A | Secondary for D | Write for C / Host Access |
| 3 | Write for D | | Read for B | Primary for A | Write for D |
| 4 | | Host Access | Write for A | Primary for B | Read for A |
| 5 | Read for C | Read for C | Write for B | Secondary for A | Read for B |
| 6 | Read for D / Write for A | Read for D | Read for C | Secondary for B | Write for A |
| 7 | Write for B | | Read for D | Primary for C | Write for B |

88 cycles / 4 packets = 22 cycles per packet = 7.5 Mpps @166 MHz

TABLE 1   SCHEDULE A

| Segment | CHR Bus | PMST | PMT | MMAP | SMT |
|---|---|---|---|---|---|
| 0 | | Host Access | Write for C | Primary for D | Read for C |
| 1 | Read for A | Read for A | Write for D | Secondary for C | Read for D |
| 2 | Read for B<br>Write for C | Read for B | Read for A | Secondary for D | Write for C<br>Host Access |
| 3 | Write for D | | Read for B | Primary for A | Write for D |
| 4 | | Host Access | Write for A | Primary for B | Read for A |
| 5 | | | Write for B | Secondary for A | Read for B |
| 6 | Read for C<br>Write for A | Read for C | Host or SBU Access | Secondary for B | Write for A |
| 7 | Read for D | Read for D | Read for C | | Write for B |
| 8 | Write for B | | Read for D | Primary for C | SBU Access |

99 cycles / 4 packets = 24.75 cycles per packet = 6.7 Mpps @166 MHz

TABLE 2   SCHEDULE B

APPARATUS AND METHOD FOR METERING AND MARKING DATA IN A COMMUNICATION SYSTEM

CROSS REFERENCE TO RELATED APPLICATIONS

This application claims priority from provisional patent application 60/273,564 filed 5 Mar. 2001, entitled APPARATUS AND METHOD FOR METERING AND MARKING PACKETS OF DATA, incorporated herein by reference.

The following U.S. patent applications, each assigned to PMC-Sierra, and all documents referred to therein are hereby incorporated herein by reference: 60/272,425; 60/274,440; Ser. Nos. 09/569,763; 09/574,305; 09/580,532.

COPYRIGHT NOTICE

Pursuant to 37 C.F.R. 1.71(e), Applicants note that a portion of this disclosure contains material that is subject to copyright protection (such as, but not limited to, source code listings, screen shots, user interfaces, web pages, or user instructions, or any other aspects of this submission for which copyright protection is or may be available in any jurisdiction.). The copyright owner has no objection to the facsimile reproduction by anyone of the patent document or patent disclosure, as it appears in the Patent and Trademark Office patent file or records, but otherwise reserves all copyright rights whatsoever.

FIELD OF THE INVENTION

The present invention relates to communication methods and/or systems. More particularly, the invention involves a method of measuring incoming data units (such as packets) against an acceptable profile with the ability to signal to a downstream element regarding appropriate actions that should be taken on the data units.

BACKGROUND

The discussion of any work, publications, sales, or activity anywhere in this submission, including in any documents submitted with this application and in any documents incorporated herein by reference, shall not be taken as an admission by the inventors that any such work constitutes prior art. The discussion of any activity, work, or publication herein is not an admission that such activity, work, or publication existed or was known in any particular jurisdiction.

Metering and marking are generally known techniques in modern communication systems to control the data rate at various points within a communication system. In a typical application, a metering and marking unit and/or process and/or component may be used to limit the rate at which a customer can inject (or transmit or upload) data into a network.

It is further known that when providing network data to a system that allows differentiated services, a user may provide data units (e.g., packets) that are classified at different importance levels. Packets belonging to a particular importance level may be guaranteed priority access to network resources—reducing delay and guaranteeing bandwidth.

Generally, in order to regulate the amount of traffic of a given importance level accepted by the network, the temporal profile of an input data stream (e.g., bytes per second (BPS) or bytes per microsecond (BPμs)) is measured against a pre-configured profile using one or more selected algorithms. Some known algorithms assign as a result of this measuring one of three determinations to input data: (1) in profile, (2) marginally above profile, and (3) in excess of an agreed-to profile. These three determinations can also be referred to as: (1) conformant, (2) partially conformant, and (3) non-conformant. In the art, these determinations can be referred to by color codes, such as GREEN, YELLOW, and RED.

REFERENCES

A number of references are related to metering in an ATM or Frame Relay context rather than in an IP and Differential-Service context.

1. U.S. Pat. No. 6,108,303, Method And Apparatus For Traffic Control In A Cell-Based Network (assigned to PMC-Sierra), presents a metering device for ATM cells which are packets of data of a fixed and constant size. The method and apparatus presented is not suitable for metering and marking packets of data which are not necessarily of a fixed and constant size and the device does not address many other issues discussed herein.
2. U.S. Pat. No. 5,835,711 Method For Implementing Multiple Leaky Bucket Checkers Using A Hybrid Synchronous/Asynchronous Update Mechanism presents a metering device for variable sized packets with 2 input colors and a single level of metering. Although it presents a synchronous update mechanism, the mechanism of the present invention provides important advantages over this one in terms of storage space, processing effort, and suitability for implementation using dynamic memory elements.
3. RFC-2475 An architecture for differentiated services
4. RFC-2697 A single rate three color marker
5. RFC-2698 A two rate three color marker

GLOSSARY

Unless defined otherwise, technical and scientific terms used herein have meanings as commonly understood by one of ordinary skill in the art to which the invention pertains. Although any methods and devices similar or equivalent to those described herein can be used in practice or for testing of the present invention, the preferred materials and methods are described herein.

The following terminology definitions are intended as an aid in understanding the description and claims of the present invention. This glossary is intended to be supplemental and does not exclude other meanings that would be understood for terms used herein by those of skill in the art.

| Term | Description |
| --- | --- |
| ATM | Asynchronous Transfer Mode. A high speed connection oriented multiplexing and switching method specified in international standards utilizing fixed length 53-byte cells. |
| Diff-serv | Differentiated Services. An Internet Engineering Task Force (IETF) initiative that seeks to define a service paradigm in which quality differentiation is based on classification and marking of packets rather than explicit resource reservation for individual flows. |
| Flow | An association of packets or data units transmitted between two end systems. In IP networks, packets with the same source address, destination address and destination port are often considered a flow if packets are sent within a relatively short period of time. |
| Metering | A measuring process of temporal properties of the traffic stream. A common metering scheme using one or more increment/decrement token buckets to determine whether a particular traffic stream is in excess of an allowed rate. |

-continued

| Term | Description |
|---|---|
| Marking | Actions taken in response to the metering result. Commonly used in public networks to prevent malicious or unintentional behavior which may adversely affect the performance of other flows. For example, in the present invention, packets can be marked at a first level and at a second level as GREEN, YELLOW, or RED to indicate the likelihood that a packet will be dropped when a network is congested. |
| Color | A code indicating a conformance level of a packet when metered against a temporal profile using a prescribed algorithm. Commonly used color codes are GREEN, YELLOW and RED. |
| Input Color | The conformance level of a packet measured against a previous temporal profile and marked accordingly. |
| Three-Color | Three possible conformance levels that arise from a dual token bucket metering algorithm-conformant, partially conformant and non-conformant, corresponding to Green, Yellow and Red. |
| Color-aware | A metering instance that uses the input color in the measurement process. |
| Color-Blind | A metering instance that does not use the input color of a packet in the measurement process. |
| IP | Internet Protocol |
| EDRAM | Embedded DRAM. A dynamic RAM instance embedded on a monolithic silicon substrate combined with logic gates. |
| Token Bucket | An increment/decrement counter used in a metering operation. According to various known protocols, a token bucket operates as follows: the token count is incremented at a regular rate (r) up to a predetermined maximum value (generally designated b and sometimes referred to as a maximum burst value); the counter is generally decremented by one for every byte received at that designated input. |
| Dual Token Buckets | A metering process that uses two counter values, one for normal traffic and a second bucket to allow bursting at a second rate. Allows traffic to have three different values and allows, through statistical multiplexing, to achieve high utilization of the network. |
| SBU | Synchronous Bucket Update. A mechanism of updating token bucket parameters on a synchronous schedule as a low rate background process. |
| ABU | Asynchronous Bucket Update. An event driven asynchronous bucket update scheme where token buckets are opportunistically updated in response to their impending use. |
| CHR | Context Header Record. A shared data structure used according to specific embodiments of the invention. The data structure is a central repository of information describing the packet. It is used to hold results of previous packet processing activities as well as the MMP results. |
| MMP | A Metering and Marking Processor and/or Process according to specific embodiments of the invention. |

SUMMARY

According to specific embodiments, the present invention provides an improved metering and marking unit. In specific embodiments, the invention offers particular advantages for hardware implementation and/or for use with IP traffic in a diff-serv context. In various embodiments, the invention provides a design with elements necessary (1) to implement a plurality of three color metering algorithms on a plurality of selectable meters, (2) to provide an efficient implementation for a two-level metering hierarchy, (3) to provide efficient data structures for storing necessary state information, (4) to provide improved data structures and mechanisms to provide a synchronous background update process that is computationally simple, (5) to provide a mechanism whereby DRAMS and/or EDRAMs can be refreshed as an advantageous side-effect of the SBU process, and (6) to provide a counter selector field that allows counting the six possible metering outcomes using only four counters.

A Metering and Marking Processor (MMP) according to specific embodiments of the present invention can be implemented as a software routine or in hardware. Some aspects of the present invention provide particular advantages when implemented in hardware and when using particular types of memory element such as dynamic memories (DRAM).

In specific embodiments, an MMP can be sized to support a desired number of flow tags, token buckets, primary meters, and secondary meters. One MMP embodiment presented here as an example provides 8K dual token buckets for primary metering (e.g., for microflow data tags) and 64 dual token buckets for secondary metering (e.g., for aggregate data tags). According to specific embodiments of the invention, each of the metering operations (primary or secondary) can support single and/or dual-token-bucket based algorithms.

The invention and various specific aspects and embodiments will be better understood with reference to the following drawings and detailed descriptions. In some of the drawings and detailed descriptions below, the present invention is described in terms of the important independent embodiment of a system operating on a digital data network. This should not be taken to limit the invention, which, using the teachings provided herein, can be applied to other situations, such as cable television networks, wireless networks, etc. For purposes of clarity, this discussion refers to devices, methods, and concepts in terms of specific examples. However, the invention and aspects thereof may have applications to a variety of types of devices and systems. It is therefore intended that the invention not be limited except as provided in the attached claims.

Various embodiments of the present invention provide methods and/or systems of data handling and/or analysis that can be implemented on a general purpose or special purpose information handling system using a suitable programming language such as Java, C++, Cobol, C, Pascal, Fortran, PL1, LISP, assembly, etc., and any suitable data or formatting specifications, such as HTML, XML, dHTML, TIFF, JPEG, tab-delimited text, binary, etc. In the interest of clarity, not all features of an actual implementation are described in this specification. It will be understood that in the development of any such actual implementation (as in any software development project), numerous implementation-specific decisions must be made to achieve the developers' specific goals and/or subgoals, such as compliance with system-related and/or business-related constraints, which will vary from one implementation to another. Moreover, it will be appreciated that such a development effort might be complex and time-consuming, but would nevertheless be a straightforward undertaking of software engineering within the skill of those of ordinary skill having the benefit of this disclosure.

It is well known in the art that logic systems and methods such as described herein can include a variety of different components and different functions in a modular fashion. Different embodiments of the invention can include different mixtures of elements and functions and may group various functions as parts of various elements. For purposes of clarity, the invention is described in terms of systems that include many different innovative components and innovative combinations of innovative components and known components. No inference should be taken to limit the invention to combinations containing all of the innovative components listed in any illustrative embodiment in this specification.

When used herein, "the invention" should be understood to indicate one or more specific embodiments of the invention. Many variations according to the invention will be understood from the teachings herein to those of skill in the art.

All references, publications, patents, and patent applications cited herein are hereby incorporated by reference in their entirety for all purposes.

BRIEF DESCRIPTION OF THE DRAWINGS

FIG. 1 is an overview block diagram illustrating a hierarchical packet metering system and/or method according to specific embodiments of the present invention FIG. 2 is an example transition diagram illustrating three color metering outcomes according to specific embodiments of the present invention.

FIG. 3 is an example transition diagram illustrating two color metering outcomes according to specific embodiments of the present invention.

FIG. 4 is a diagram illustrating an example of single rate dual-bucket metering according to specific embodiments of the present invention.

FIG. 5 is a diagram illustrating an example of a two rate dual bucket algorithm according to specific embodiments of the present invention.

FIG. 6 is a diagram illustrating an example of a single bucket algorithm according to specific embodiments of the present invention.

FIG. 7 is a diagram illustrating an example of floating point rate representation according to specific embodiments of the present invention.

FIG. 8 is a diagram illustrating an example of updating token counts according to specific embodiments of the present invention.

FIG. 9 is a diagram illustrating an example of computing the elapsed time according to specific embodiments of the present invention.

FIG. 10 is a diagram illustrating an example of selecting the primary meter selector according to specific embodiments of the present invention.

FIG. 11 is a diagram illustrating an example of a primary meter selector format according to specific embodiments of the present invention.

FIG. 12 is a diagram illustrating an example of selecting the primary meter according to specific embodiments of the present invention.

FIG. 13 is a diagram illustrating an example of a primary meter format according to specific embodiments of the present invention.

FIG. 14 is a diagram illustrating an example of selecting the secondary meter according to specific embodiments of the present invention.

FIG. 15 is a diagram illustrating an example secondary meter format according to specific embodiments of the present invention.

FIG. 16 is a block diagram of an example wrapper implementation according to specific embodiments of the present invention.

FIG. 17 is a diagram illustrating an example arithmetic pipeline for an MMAP according to specific embodiments of the present invention.

FIG. 18 is a illustrates an example logic system that according to specific embodiments can be configured to embody aspects of the present invention.

Table 1 is a diagram illustrating an example of a pipeline schedule a according to specific embodiments of the present invention.

Table 2 is a diagram illustrating an example of pipeline schedule b according to specific embodiments of the present invention.

DETAILED DESCRIPTION OF SPECIFIC EMBODIMENTS

1. Operation and Component Overview

Overall MMP Operation

According to specific embodiments of the present invention, a Metering and Marking Processor receives or reads a flow tag and/or packet length and/or input color associated with a packet or other protocol data unit (PDU). The MMP performs metering operations based on this input information and provides one or more action selectors and optionally other result tags (such as the primary and secondary meter identifier and conformance levels at those meters) that can be used by downstream components in a communication system. Action selectors may be used by a downstream component to perform some action based on the data within the action selectors. Action selectors may be used to modify a field in a data unit exiting a network system according to specific embodiments of the present invention, such as an TOS field in a IPV4 packet. Action selectors and/or results tags may also be used by a downstream component according to specific embodiments of the present invention to determine an output port for a data unit.

An MMP according to specific embodiments of the invention is responsible for measuring each incoming microflow against one or two specified temporal profiles by using a two-level metering hierarchy as illustrated in FIG. 1. Incoming microflows are identified by a flow tag inserted in the context header record (CHR) by an upstream component.

Based on the results of one or two metering operations, the MMP will provide an action selection (which can include an instruction and/or data and/or a mask) that may be used by a downstream component to perform an appropriate action on the corresponding packet. In specific embodiments, an action selection is stored by the MMP in an action selector field of the CHR. The MMP also provides other information in fields of the CHR for downstream use, including counter information used by a downstream component for gathering statistics and other result data.

According to specific embodiments of the present invention, it is assumed that prior to the meter and marking of the invention, data units have been identified or tagged with a flow tag assigning the units to one of a number of different flows. For example, it is known to use some type of classifier device or process to inspect incoming packets (or other data units) and associate packets with an identification tag (or flow tag) that is a function of the data within the packet. In various systems and instances, such a flow tag can be assigned based on such things as, for example, a source address, destination address, and/or type of service (TOS) tag associated with a packet. In one example known protocol, a TOS flag is placed in a packet header and can be one of 64 different values. In general, classifier devices are well known in the art and described in the literature.

In addition to a flow tag, an incoming data unit to an MMP according to the invention may have assigned to in an incoming color code, indicating a drop precedence value associated with the packet before the MMP processing. In specific implementations, an incoming data units flow tag and its initial input color are stored in a CHR memory structure, as described below, from which the tag is read by the MMP.

According to specific embodiments of the present invention, a natural limit for an aggregate flow is the maximum allowed rate of a channel. According to specific embodiments of the present invention, each aggregate meter only needs the same resolution and capacity as one microflow meter, because a microflow can consume an entire aggregate.

According to specific embodiments of the present invention, hierarchical metering is an advantage within a routing system because microflows only need be handled and meter at the consumer edge of the network system. Everything component after the primary metering need only deal with aggregate flows and according to specific embodiments of the present invention a router core need never look at the microflow tags.

According to specific embodiments of the present invention, it is understood that an external management function configures the data specifying the operation of the primary and secondary meters as would be understood to those of skill in the art.

CHR

According to specific embodiments of the invention, the input data flow tag and packet length and the MMP output action selectors, and counter selector are provided through a Context and Header Record (CHR). According to specific embodiments of the invention, the CHR resides in a multi-port memory that is accessible by the MMP and by upstream and a downstream components. According to further specific embodiments, the CHR records are also transmitted to different system components when necessary. According to specific embodiments of the invention, based on the input data provided in the CHR, the MMP meters the packet against one or two traffic profiles. The results of the metering operations are stored as an Action Selector within the CHR.

Tables

Parameters specifying the traffic profile configuration for each meter along with the metering action for each possible metering result are held in various tables implemented by SRAMs and a DRAM. According to specific embodiments of the present invention, these tables can be configured through registers accessed using the internal bus interface provided by a wrapper component as discussed below. Status information and various statistics may also be extracted through specific registers for debugging purposes.

Meters

An MMP according to specific embodiments of the present invention implements 8,192 primary meters and 64 secondary meters. Each meter includes two token buckets (which can be designated Bucket 0 and Bucket 1) and can be configured to implement a specific metering algorithm using one or both of its token buckets. According to specific embodiments of the present invention, each microflow indicated by the CHR may be metered using one of the primary meters followed by one of the secondary meters. Primary and secondary meters according to specific embodiments of the invention can be used in a two-level metering hierarchy for microflow and aggregate metering respectively.

Token Buckets

According to specific embodiments of the present invention, each of the (8,192) primary meters and (64) secondary meters implements token-bucket-oriented metering algorithms. Each of the primary meters and secondary meters includes a dual token bucket that can be configured for either dual or single bucket operation. In specific example embodiments, each token bucket has a byte-based granularity (1 token=1 data byte) and supports a Bucket Size of 1 Mbytes. In specific embodiments, each token bucket is updated using a time reference having a microsecond (μs) granularity with the token accumulation rate (r) for each bucket configurable with 0.2% worst case granularity from order of 7 Kbyte/sec to 300 Mbytes/sec.

One basic principle of the token bucket is that a bucket of capacity b is filled by a constant rate of r. The result of this formula measures whether the bucket is empty (or more precisely, whether there are sufficient tokens available for the incoming packet). A token bucket is known as a prevalent way to classify packets into two classes (such as in profile and out of profile, conformant and non-conformant, or RED and GREEN), where the profile is defined by two parameters, r and b. When the input packet rate is less than r over an extended period, a token bucket will contain sufficient tokens for transmission and packets will be deemed and marked as conformant. If a source suspends transmission, tokens accumulate in the bucket at the rate of 1/r up to a maximum of b tokens. A packet source can burst up to a the amount of tokens in the bucket (with a maximum of b bytes), thereby depleting the tokens. Packets subsequent to this from that data source will then be marked as nonconformant.

Other measurement schemes are possible by combining multiple token buckets in a single metering operation. According to specific embodiments of the present invention, two independent token buckets are used in each meter to form a dual token bucket meter. One advantage of a dual token bucket scheme is that it allows traffic to be assigned a committed rate, an excess rate and a peak rate, thus allowing the traffic rate to burst from a committed rate up to an excess rate and finally be capped at a peak rate. Traffic marked as being within the committed rate (or conformant) is unlikely to be discarded in the event of network congestion, traffic in excess of the committed rate, but less than the peak is carried by the network and may be subject to discard in the event of network congestion. And finally, traffic in excess of the peak rate is only carried if excess network capacity exists at that time and it may be proactively discarded to prevent network congestion. A dual bucket scheme according to specific embodiments of the present invention allows a traffic contract that efficiently handles traffic bursts and closely matches the offered load of modern data communication networks.

Token Bucket Parameters: Rate

According to specific embodiments of the invention, a Token accumulation rate is specified in bytes per microsecond using a floating point notation which consist of a 9-bit mantissa (m) and a 5-bit exponent (e). To ensure a unique representation for a given rate, the mantissa is interpreted with an implied leading one as illustrated in FIG. 7. Using this floating point encoding, the rate can be expressed as $(2^5+m)*2^{-e}$. This encoding provides a worst-case granularity of 0.2%. For example, setting the mantissa to zero, and setting the exponent to nine results in the specification of a rate of 1 byte per microsecond. $(2^9+0)*2^{-9}=1$ byte/us In applications of the MMP, a user may specify a rate which can be expressed exactly in the floating point representation, or may specify an arbitrary rate which cannot be expressed exactly with the floating point representation. In the latter case, a typical application may configure the rate parameter to the lowest value exceeding the desired rate.

Meter Selectors

Primary

According to specific embodiments of the present invention, Meter Selectors specify primary and secondary meters and can further specify the color to be input to the metering algorithm of the given meter. An example MMP implementation includes a table of 8,192 Primary Meter Selectors (or table entries), each associating an incoming 13-bit flow tag as read from the CHR to a primary meter and to an input color. According to specific embodiments of the present invention, if a classifier or either meter is color-blind, it does not look at the TOS byte, and IN_COLOR is always coded as green. In color aware mode, IN_COLOR indicates green, yellow, or red.

Secondary

The Secondary Meter Selectors associate a conformance level resulting from a primary meter to one of the 64 secondary meters and provides the input color to be used in the secondary metering algorithm. In addition, the secondary meter selector provides the option of using the 'initial' color that was used for primary metering as input to the secondary metering algorithm (instead of using the color specified for the result of the primary metering operation). As each Primary Meter can yield one of three possible conformance levels, each primary meter corresponds to three Secondary Meter Selectors (or table entries), each having at least six bits to indicate one of the 64 secondary meters. In an example implementation, there are a total of 24K Secondary Meter Selectors, three for each of 8K Primary Meters.

Action Selectors

A downstream action to be performed on a packet based on the Conformance Level from a metering operation is specified through an Action Selector. After the metering operations have been performed for a packet, the action to be applied to the packet by a downstream element is communicated by setting specific fields of the CHR. In an example implementation, there are three possible Actions indicated by the Action Selector: (1) NO ACTION, (2) Packet is to be DISCARDED, (3) Packet TOS byte is to be REMARKED. To support remarking, an Action Selector according to specific embodiments of the present invention includes a Action Data Sub-Field that can contain TOS Remarking Data and a TOS Remarking Bit Mask.

An MMP according to specific embodiments of the invention allows separate actions to be defined for each possible outcome of each primary and each secondary meter. Thus, in a particular embodiment, there are a total of 24K plus 64 times 3 separate actions that can be defined.

In addition, a Secondary Meter Action Selector according to specific embodiments of the present invention includes one or more configuration bits to select whether the action to be applied to a packet should be (1) the action specified by the primary metering operation or (2) the action specified by the secondary metering operation or (3) the "worst" action specified by the primary meter or secondary meter. In specific embodiments, only one bit may be provided to select between the first two choices. A further configuration bit can allow the action for a given metering result to be skipped if the conformance result corresponds to the input color of the packet (GG, YY, or RR arcs in FIG. 2).

According to specific embodiments of the present invention, action tags can be used by a downstream component to modify a TOS field in a typical IP packet. In general, other than the external port by which data leaves a network device, this flag is the only thing that can carry data from the MMP. According to specific embodiments of the present invention, the MMP uses a code and a mask that can be used downstream to change bits in a packet and thereby change the TOS code (or class) of the packet. Codes in the TOS are generally user-definable and are generally used to imply a certain class of service that a packet will receive.

Counter Selectors

According to specific implementations of a network system embodying aspects of the present invention, a component downstream of the MMP keeps statistics regarding packets. In a specific embodiments, such statistics are kept for each of the primary meters and for each of the secondary meters.

Thus, based on the outcome from each of the metering operation, the MMP will output a counter selector for each meter used. This counter selector will be included in the outgoing CHR, allowing a downstream block to keep statistics on the outcome of all packets processed by a given meter. According to specific embodiments of the present invention, the counter selector identifies one of four per-meter counters to be incremented. In the case of three-color metering, each of the six possible metering outcomes, illustrated by the labeled arcs in FIG. 2, will produce one of the four counter selector as follows:

Counter Selector 0: Conformant Result (input G→output G)

Counter Selector 1: Partially Conformant Result (input G→output Y+input Y→output Y)

Counter Selector 2: Severely Downgraded (input G→output R)

Counter Selector 3: Non-Conforming but not Severely Downgraded (Y→R+R→R)

By counting these counter selections and with the knowledge of the counts for each of the incoming colors (IG, IY, IR, These counts may be provided by a component accumulating per-flow statistics.), the counts for each of the 6 arcs may be determined as follows:

GG:=Counter 0

GY:=IG-Counter 0-Counter 2

GR:=Counter 2

YY:=Counter 1-(IG-Counter 0-Counter 2)

YR:=Counter 3-IR

RR:=IR

For single bucket metering algorithms, the possible outcomes are a subset of those for three color metering, as illustrated in FIG. 2. Note that in this case, the counters identify exactly the number of packets associated with each arc in FIG. 3, and that Counter 3 would be equal to the number of incoming red packets (IR). Only three counter selectors are used, and they are defined as follows:

Counter Selector 0: Conformant Result (GG)

Counter Selector 2: Severely Downgraded (GR)

Counter Selector 3: Non-Conforming but not Severely Downgraded (RR)

2. Example Component Implementation Details

Provided below are descriptions of a specific example implementation according to specific embodiments of the invention. Throughout, specific components are described including specific data structures and sizes. These are provided as examples only and should not be understood to limit the invention.

Primary Meter Selector Table (PMST)

An example Primary Meter Selector Table (PMST) contains 8,192 entries, each representing a Primary Meter Selector and using 16 bits of storage. The particular Primary Meter Selector associated with the 13-bit flow identifier provided in an incoming Context Header Record is selected by extracting the appropriate PMST entry as illustrated in FIG. 10. An example definition of the Primary Meter Selector is illustrated below.

InCol[1:0]: Input Color for use in the Primary Metering Algorithm

| InCol | Definition |
|---|---|
| 00 | Disable Primary Metering |
| 01 | Green |
| 10 | Yellow |
| 11 | Red |

PriMtr[12:0]: Specifies which of the 8,192 Primary Meters is to be used for primary metering Prty: Optional odd parity bit, provides odd parity over the PMS entry.

Primary Meter Table (PMT)

The Primary Meter Table (PMT) contains 8,192 entries, each requiring 256-bits of storage to represent a dual-bucket meter and various result-associated information. This result-associated information includes actions, remarking information, and secondary meter selectors. The Primary Meter to be used for metering a flow is selected using the 13-bit primary meter identifier field (PriMtr[12:0]) of the Primary Meter Selector as illustrated in FIG. 11. The definition of the Primary Meter Format is illustrated in FIG. 13. Note that the format is shown based on a 32-bit word size for illustrative purpose only.

In a specific example embodiment, the Primary Meter Format fields are defined as indicated below:

Algo[3:0]: Metering Algorithm used with this meter

| Algo | Definition |
|---|---|
| 0000 | Not Defined in this implementation |
| 0001 | SRTCM (Dual Bucket) |
| 0010 | TRTCM (Dual Bucket) |
| 0011 | Single Bucket |
| <others> | Not Defined in this implementation, can indicate further algorithms |

B0_Rate[13:0]: The Token Accumulation Rate Configuration for Token Bucket 0, using the following floating point representation:
  [13:5]→Man[8:0]: The 9-bit mantissa
  [4:0]→Exp[4:0]: The 5-bit exponent B1_Rate[13:0]: The Token Accumulation Rate Configuration for Token Bucket 1 (uses the same format as B0_Rate).

Saturate: Saturation Flag indicating that the buckets of this meter have not been updated for a long period of time and must therefore be saturated before use (set by SBU process) (Saturation Flags for the primary meters could be moved to an SRAM instance to further reduce the bandwidth from the SBU to the PMT DRAM.).

Tstamp[30:0]: The single Timestamp indicates the last update time for both buckets of the meter.

B0_TCH[15:0], B0_TCL[3:0]: The high and low portions of the 20-bit Token Count state variable for bucket 0, indicating the number of tokens currently held in the bucket.

B1_TCH[15:0], B1_TCL[3:0]: The high and low portions of the 20-bit Token Count state variable for bucket 1, indicating the number of tokens currently held in the bucket.

B0_BSH[15:0], B0_BSL[3:0]: The high and low portions of the 20-bit Bucket Size parameter for bucket 0, indicating the maximum number of tokens that can be held in the bucket.

B1_BSH[15:0], B1_BSL[3:0]: The high and low portions of the 20-bit Bucket Size parameter for bucket 1, indicating the maximum number of tokens that can be held in the bucket.

C_SMS[8:0]: Conformant result Secondary Meter Selector, specifies the secondary metering to be applied following a Conformant result from the primary meter.
  [8:7]→InCol[1:0]: Input Color for use in the Secondary Metering Algorithm

| InCol | Definition |
|---|---|
| 00 | Disable Secondary Metering |
| 01 | Green |
| 10 | Yellow |
| 11 | Red |

[6]→UseIC: This flag, when set to '1', specifies that the secondary metering algorithm must use the initial color that was used for primary metering rather than that specified using InCol.
  [5:0]→SecMtr[5:0]: Specifies which of the 64 Secondary Meters is to be used for secondary metering C_Action[22:0]: Conformant result Action, specifies the action to be applied following a Conformant result from the primary meter.
  [22]→DGOnly: Specifies that the action selector for this metering operation is to be set to all zeros if the resulting conformance level corresponds to the incoming color for this metering operation.
  [21:20]→Rsvd[1:0]: Reserved field
  [20:0]→Action_Selector[20:0]: Specifies the action selector field to be written back into the CHR PC_SMS[8:0]: Partially Conformant result Secondary Meter Selector, specifies the secondary metering to be applied following a Partially Conformant result from the primary meter (see C_SMS for fields definition).

PC_Action[22:0]: Partially Conformant result Action, specifies the action to be applied following a Partially Conformant result from the primary meter (see C_Action for fields definition).

NC_SMS[8:0]: Non Conformant result Secondary Meter Selector, specifies the secondary metering to be applied following a Non Conformant result from the primary meter (see C_SMS for fields definition).

NC_Action[22:0]: Non Conformant result Action, specifies the action to be applied following a Non Conformant result from the primary meter (see C_Action for fields definition).

PrtyH[7:0], PrtyL[7:0]: The high and low components of an optional parity word computed over the entire record.

Secondary Meter Table (SMT)

The Secondary Meter Table (SMT) contains 64 entries, each requiring 256-bits of storage to represent a dual-bucket meter and various result-associated information. This result-associated information includes actions and remarking information. The Secondary Meter to be used for metering a flow is selected using the 6-bit SecMtr sub-field of the appropriate Secondary Meter Selector (SMS) based on the result of the primary metering operation as illustrated in The Secondary Meter Format is illustrated in FIG. 15. Note that the format is shown based on a 32-bit word size for illustrative purpose only. The positions and definitions of fields of the Secondary Meter are largely identical to those of the Primary Meter (see FIG. 13), except for the absence of further meter selectors and the definition of the following additional sub-fields to the action fields.

Additional Fields to: C_Action[22:0], PC_Action[22:0], NC_Action[22:0]

[21]→UsePA: Use Primary Action, specifies that the action selector to be written in the CHR is to be the one resulting from the primary metering operation. If this bit is not asserted, then the action selector used will be that resulting from the second metering operation. In a further embodiment, a further data indication can specify to use the one of the two results, based on some criteria, such as which result is "WORST" in terms of requiring the greatest downgrade.

3. Metering Algorithms

According to specific embodiments of the present invention, an MMP can implement three metering schemes. These are referred to as (1) Single Rate Dual-Bucket, (2) Two Rate Dual-Bucket, and (3) Single Bucket. In a specific implementation, all of scheme are based on buckets for which 1 token is used per byte of the packet and have the restriction that a packet may use tokens from at most one bucket.

Dual-Bucket metering supports three color markings (which can also be referred to as drop precedence marking), while the Single-Bucket scheme supports two color markings. Each of these schemes may be used in a color-aware or color-blind mode. The color-blind mode is a special case of the color-aware mode, in which the incoming color is assumed to be GREEN. This mode is implemented by setting the input color field to GREEN for all meter selectors specifying a given meter.

Single Rate Dual-Bucket

The Single Rate Dual Bucket Metering algorithm (reference 4), illustrated in FIG. 4, features two token buckets which can be interpreted as buckets of GREEN and YELLOW tokens respectively. (Tokens from these two buckets can also be referred to as "Committed" (Tc, corresponding to GREEN) and "Excess" (Te, corresponding to YELLOW) tokens. Packets are metered based on their incoming color and their total packet length (Psize). GREEN packets use tokens from the GREEN bucket (bucket 0, token count Tc) if a sufficient number is available, or else use tokens from the YELLOW bucket (bucket 1, token count Te). Green packets using tokens from the yellow bucket will be deemed partially conformant and will be remarked as YELLOW packets.

Packets identified as YELLOW may only use tokens from the YELLOW bucket. Red packets and packets for which a sufficient number of token are not present in any allowed bucket are deemed non-conformant and are remarked RED.

The Single Rate Dual-Bucket Metering algorithm can be configured to conform to the known Single Rate Three Color Marker (SRTCM) algorithm. This is done by setting the bucket 0 rate and size parameters to CIR and CBS respectively, and setting the bucket 1 rate and size parameters to CIR and EBS respectively. By selecting the Single Rate Dual-Bucket algorithm, the token accumulation of the second bucket will be configured to only occur once the first bucket is full (adding the excess number of tokens once the first bucket reaches the full point) in accordance with the SRTCM specification.

Two Rates Dual-Bucket

The Two Rates Dual Bucket Metering algorithm (reference 5), illustrated in FIG. 5, features two token buckets which can be interpreted as a GREEN AND YELLOW TOTAL bucket (bucket 0, token count Tp, and total in the sense of measuring the total combined rate of the green and yellow packets.) and a GREEN bucket (bucket 1, token count Tc). The rates for each of the two buckets are also referred to as 'Peak Rate' (Tp) and 'Committed Rate' (Tc) respectively.

Packets marked as green or yellow use tokens from the TOTAL bucket if available, otherwise the packets are deemed non-conformant and downgraded. Additionally, packets marked as GREEN from bucket 0 use tokens from bucket 1 if available otherwise they are deemed partially conformant and downgraded. The Two Rates Dual-Bucket algorithm can be configured to conform to the known Two Rate Three Color Marker (TRTCM) algorithm. This is done by setting the bucket 0 rate and size parameters to CIR and CBS respectively, and setting the bucket 1 rate and size parameters to PIR and PBS respectively.

Single Bucket

The Single Bucket metering algorithm, illustrated in FIG. 6, uses a single bucket and a two-color scheme where incoming packets are either labeled 'green' or 'red'. The algorithm meters all packets marked as green against the single bucket. Packets for which the bucket contains sufficient tokens are deemed conformant and so marked, while those for which the bucket contains insufficient tokens are deemed non-conformant and so marked. Incoming packets not marked as green are automatically deemed non-conformant.

4. Token Bucket Updates

Asynchronous Bucket Updates (ABU)

The MMP provides an accurate emulation of a continuous state token bucket which accumulates tokens at a constant rate. When a packet is received for a given meter, the MMP must update the number of tokens in each of the two buckets for that meter before use. This is accomplished by computing the number of tokens which have been 'virtually accumulating' since the previous packet for this meter has been received, and adding it to the number of tokens already in the bucket up to the bucket size limit for the bucket as shown in FIG. 8. Note that in the case of a meter configured for Single Rate Dual-Bucket metering, the second bucket (bucket 1) of the meter is updated by adding up the 'excess' tokens computed for the first bucket.

Roll-Over Problem

The Asynchronous Bucket Update (ABU) generally relies on the assumption that the 'current time' must always be greater than the 'timestamp' value in the subtraction yielding the elapsed time. In a physical implementation, however, the time reference producing the 'current time' and the 'timestamp' must have a finite rollover period (for example, $2^{31}$ microseconds in particular implementation). This finite rollover period affects the computation of the elapsed time in two ways. The first rollover effect occurs when the a rollover of the 'current time' occurs. In this case the value of the 'current time' is now in a frame of reference different than that of the 'timestamp' value. Nevertheless, the elapsed time may still be determined by adding up the two elapsed time segments shown in FIG. 9. In this particular case, the elapsed time is: Elapsed Time=Current time+($2^{31}$−Timestamp). The second rollover effect occurs at a later time, when the 'current time' value is left to go all the way to the 'timestamp' value. At this point, the 'current time' is equal to the 'timestamp' and the computed Elapsed Time has rolled over to zero making it impossible to determine whether the elapsed time is zero or whether it is equal to a multiple of the time counter period. From this point on, it is impossible to determine the Elapsed Time from the Current Time and Timestamp.

Addressing Roll-Over Using Synchronous Background Update (SBU) Process

According to specific embodiments of the invention, a solution to the rollover problem is a two prong approach consisting of the following:

(1) Providing a Current Time and Elapsed Time rollover period far exceeding the Saturation Time, where the Saturation Time is defined as the elapsed time required to guarantee that all buckets of a given meter have accumulated their maximum number of tokens, assuming the worst case meter configuration (e.g., minimum rate, maximum bucket sizes, SRTCM algorithm);

(2) providing a Synchronous Background Update (SBU) process that will sequentially examine each meter and set a Saturation Flag on the meters for which the Elapsed Time has exceeded the Saturation Time. This ensures that the Saturation Flag of a meter will be set prior to its Elapsed Time rolling over. According to specific embodiments of the present invention, the ABU process ignores the Elapsed Time of a meter for which the Saturation Flag is set and updates the token buckets when invoked by saturating them before use. In specific embodiments, the Current Time Counter Period and the period for the SBU to process all meters are selected appropriately, as described further in the Implementation Description.

According to specific embodiments of the present invention, by implementing a time counter period far exceeding the Saturation Time, the computation of the elapsed time for the SBU process can be made pessimistically with less precision, thereby advantageously reducing the number of bits required in the implementation of the arithmetic operations.

In one example design of the MMP, the period of the time counter is 2147 seconds ($2^{31}$ microseconds) and the Saturation Time for the worst case configuration (7 Kbyte/sec, two buckets of 1 Mbytes bucket size, SRTCM algorithm) is 300 seconds. Therefore the SBU process must ensure that all meters are processed within 1847 seconds, which translates to processing one meter every 0.2237 seconds. The use of a Saturation Flag in lieu of the computation of accumulated tokens by the SBU process greatly simplifies and speeds up the SBU process and reduces the utilization of the memory bandwidth does not require the use of complex arithmetic circuits.

Providing RAM Refresh Using Synchronous Background Update (SBU) Process

According to further specific embodiments of the present invention, an SBU Process is designed to provide an inherent refresh for physical RAM while examining bucket memory to determine if a Saturation Bit for a bucket must be set. This has advantages in implementations by eliminating the need for additional memory refresh cycles and/or circuitry and/or processes for DRAMs. According to specific embodiments of the present invention, the SBU is thus designed by first ensuring that SBU rate is fast enough to provide the necessary refresh rate for the particular physical memory storing the bucket data in order to ensure that all the rows of the memory are visited in a certain period of time. Thus, according to specific embodiments of the present invention, and SBU is designed to access memory by visiting each RAM row at a particular column and then moving to a next column and visiting each row again. In a typical DRAM, the most significant M bits of the address indicate rows. Thus, according to specific embodiments of the present invention, and SBU is designed to work with particular physical memory characteristics.

With reference to the pipleined implementation discussed below, in specific embodiments, as the SBU process in the PMP is also responsible for the EDRAM refreshing operation, the SBU process period is made shorter. The meter order for the SBU process has been carefully chosen to access a different row in each access. In order to visit all 1024 rows of the EDRAM in at most 8 ms, the SBU process is scheduled every 275 cycles, thereby refreshing all rows of the EDRAM every 3.4 ms (275*2*1024*6 ns), for an SBU process period of 27 ms (far less than the 1847 seconds required).

When triggered to perform an SBU operation, the PMP will alternate between reading and writing operations. When triggered for the first time, the PMP will read the timestamps of one meter. The PMP will then determine the elapsed time exceeds the Saturation Time (defined earlier in this document) and the Saturation Flag must be set. When triggered for the second time, the PMP will update the meter for which the Saturation Flag must be set. The split is done in this implementation because the 11-cycles available per segment are not sufficient for a read-modify-write of the required fields in the DRAM.

As the SBU process will sequentially examine each of the counters, all of the DRAM rows will be accessed. By specifying a meter ordering that corresponds to a sequential increment of the row address, the SBU process will guarantee that all rows used are refreshed within less than 1 ms. Note that the unused memory locations will be shared amongst all PMT entries, and therefore all rows of the DRAM device will be used and refreshed. The SMT is implemented in a 16 Kbit single port SRAM with a 64-bit data bus, fully utilizing the 256 memory locations of the instance. Note that, although it is illustrated using 32-bit words in, the Secondary Meter Table entry is implemented as a four 64-bit words from the memory. All illustrations are shown with a big-endian convention.

As a further implementation efficiency according to specific embodiments of the present invention, the invention checks if the elapsed time has exceeded a value by only examining a certain number of the most significant bits to ascertain whether it has exceeded that value.

5. Wrapper Interface Implementation

An example wrapper implementation may be broken up as shown in FIG. 16. In this example implementation and embodiment of the invention, an MMP is broken down into a number of sub-blocks. The flow tag and packet length are written into the wrapper memory by an upstream classifier block using the Take Interface. The PWIC block detects this action and reads this input information from the shared memory. The PWIC forward this information to the PMSP block and takes care of triggering the operation of the PMSP, PMP, SMP, and MMAP sub-blocks in order to perform the metering and marking operation.

The PWIC can be implemented as a state machine to schedule all operations using a fixed set of possible operation sequences. The use of fixed and predefined sequences of operations greatly simplifies the sharing of resources of this embodiment, such as the pipelined Metering and Marking Algorithm Processor (MMAP), and the arbitration of accesses to memories. Having a predetermined pipeline schedule and a single point of control also simplifies performance analysis, verification of all corner cases, and recovery from state corruption. Once the metering operations are completed, the PWIC receives the action selector word from the SMP along with the Counter Selector for the primary metering and the Counter Selector for the secondary metering and writes them into the CHR. The PWIC also handles host accesses to configure and update the various memories.

Primary Meter Selector Processor (PMSP)

The Primary Meter Selector Processor (PMSP) may be triggered by the PWIC to perform the Primary Meter Selection for an incoming CHR or to Perform a Host Access to the PMST. When triggered to perform the Primary Meter Selection for an incoming CHR, the PMSP takes in the packet length and the flow tag provided by the PWIC block. Based on the flow tag, the PMSP extracts the Primary Meter Selector (PMS) associated with the microflow from the Primary Meter Selector Table (PMST) SRAM. Finally, the PMSP passes down the following information to the Primary Metering Processor: Primary Meter Selector (including input color) and Packet Length Primary Metering Processor (PMP)

The Primary Metering Processor (PMP) may be triggered by the PWIC to perform the following operations: Perform the Primary Metering on the CHR, Perform a Primary Meter Update after metering, Perform an SBU operation, Perform a Host Access to the PMT.

When triggered to perform the Primary Metering on the CHR, the PMP receives the Primary Meter ID, packet length, and input color from the PMSP. Based on the PriMtr field of the PMS, the PMP will select and extract the appropriate Meter entry from the Primary Meter Table DRAM. The PMP will then provide data from the PMT entry along with the packet length, input color, and elapsed time, computed based on the difference between a Microsecond time counter in the PMP and the timestamp in the PMT entry, to the Metering and Marking Algorithm Processor (MMAP). At a predetermined later time, the PWIC will trigger the PMP to receive the result from the MMAP and update the state variables of the meter in the PMT.

Based on the result of the metering operation, the PMP will pass down the following information to the Secondary Metering Processor: Secondary Meter Selector (including input color), Packet Length, Packet Receive Time, Primary Meter Counter Selector, and Primary Metering Action based on the primary metering result.

When triggered to perform an SBU operation, the PMP will alternate between reading and writing operations. When triggered for the first time, the PMP will read the timestamp of a given meter. The PMP will then determine whether the Saturation Flag of any of this meter should be set by calculating if it's elapsed time exceeds the saturation time. When triggered for the second time, the PMP will update the saturation flag if the latter is to be set.

As the SBU process will sequentially examine each of the counters, all of the DRAM rows will be accessed. By specifying a meter ordering that corresponds to a sequential increment of the row addresses of the dynamic memory, the SBU process can advantageously guarantee that all rows used are refreshed significantly more often than is specified by the DRAM manufacturer. This is highly advantageous as it eliminates the need to perform the refresh commands which are usually required when using dynamic memories.

Secondary Metering Processor (SMP)

The Secondary Metering Processor (SMP) may be triggered by the PWIC to perform the following operations: Perform the Secondary Metering on the CHR, Perform a Primary Meter Update after metering, Perform an SBU operation, and Perform a Host Access to the PMST.

When triggered to perform the Secondary Metering on the CHR, the SMP receives the Secondary Meter Selector, Packet Length, and Primary Metering Action from the PMP. It also receives the value of the Microsecond Counter used as a time reference, and the Primary Counter Selector which is passed through for gathering statistics on the Primary Metering. Based on the SecMtr field provided by the PMP, the SMP will select and extract the appropriate Secondary Meter entry from the SMT DRAM. The SMP will then provide data from the SMT entry along with the packet length and input color to the MMAP along with the elapsed time computed as the difference between the Microsecond Counter value and the value in the timestamp field of the SMT entry. At a predetermined later time, the PWIC will trigger the PMP to receive the metering results from the MMAP and update the state variables of the meter in the PMT.

Based on the result of the metering operation and the configuration of the corresponding Secondary Metering Action, the SMP will determine the action selector to be output and will return it along with the Primary Counter Selector and the Secondary Counter to the PWIC sub-block.

When triggered to perform an SBU operation, the SMP will read the timestamp of a given secondary meter, set the Saturation Flag of the meter if it's elapsed time exceeds the saturation time, and immediately update the word containing the flag in the SMT SRAM.

Metering and Marking Algorithm Processor (MMAP)

The Metering and Marking Algorithm Processor (MMAP) block performs the computation required to meter a packet using one of the supported algorithms. The MMAP performs the standard metering algorithms described earlier. Advantageously, in this embodiment a single MMAP sub-block is shared between the PMP and SMP blocks to perform the arithmetic algorithm portion of the metering operation.

Furthermore, in the case of Dual Bucket Metering algorithms such as SRTCM and TRTCM, the arithmetic computation pipeline within the MMAP can be used twice to compute the updated state variables of both buckets. As the MMAP may be used for primary and secondary metering, its arithmetic pipeline may be used as many as four times when processing a single CHR. This high utilization is highly advantageous as it avoid replicating the pipelined multiplier, floating point conversions, and other complex circuitry.

When triggered by the PWIC, the MMAP receives the fields of the meter record as well as the packet length and the elapsed time. Based on the configuration fields and state variables held in the meter record, the MMAP executes the selected metering algorithm. After completing the metering operation, the MMAP returns the conformance result and the updated meter state variables to the appropriate metering processor (PMP or SMP).

Microsecond Time Counter (MTC)

The Microsecond Time Counter (MTC) is a sub-block within the PMP, which provides a time reference used in metering. The MTC divides the system clock by a constant configured by a register. This constant is chosen to provide a 1-microsecond time reference based on the system clock frequency. Using a system clock of 166 MHz, the clock divider constant would be configured to 166 to provide a microsecond time reference. This signal synchronously increments a 31-bit counter representing the 'current time'. The MTC can be preloaded and stopped by software for verification purposes. The counter has a rollover period of $2^{31}$ microseconds (35.8 minutes).

Also note that the MMAP measures temporal properties of the packet based on the 'current time' recorded when the CHR is processed by the PMP. As the components upstream may include elastic buffers and operations which will affect temporal properties, the specification of metering parameters, in particular the bucket-size, must include some headroom to accommodate for this possible distortion.

6. Example Processing Pipeline

One implementation of an MMP according to specific embodiments of the present invention makes extensive use of a number of shared resources to process each CHR and to process incoming configuration and status requests from the Host. These shared resources include: The CHR local interface to the wrapper, the PMST SRAM, the PMT DRAM, the Metering and Marking Algorithm Processor (MMAP), and the SMT SRAM.

As the complete processing of a CHR requires a number of cycles exceeding the minimum inter-packet delay, an MMP according to specific embodiments of the present invention makes extensive use of pipelining to perform the various operations required in the processing of a CHR. As the highly-utilized shared resources are read and updated in an interleaved fashion for multiple CHRs, the pipeline schedule is designed to ensure that appropriate caching mechanisms are provided to ensure that interleaved operations operating on common data are done with a consistent view and without corrupting the shared data.

Pipeline Schedule

For these reasons and also to greatly simplify design, performance analysis, and verification of correctness; a Main Pipeline according to specific embodiments of the present invention has been designed based on predetermined scheduling. In order to provide maximum throughput during periods of time where no SBU or host access to the meter tables are required; the Main Pipeline of the MMP includes two distinct schedules:

Schedule A, used when no background requests are present, provides for the processing of 4 CHRs in 88 cycles (average of one every 22 cycles) for a throughput 7.5 Million CHRs per second.

Schedule B, used when a background request is present, provides for the processing of 4 CHRs in 99 cycles (average of one every 24.75 cycles) for a throughput of 6.7 Million CHRs per second.

Schedules A and B are illustrated in Tables 1 and 2. To simplify the view of the pipeline schedule, the processing cycles have been broken up in segments of 11-cycles, which corresponds to the longest operation period for all shared resources. All operations on all shared resources are allocated one segment, except for those on the CHR bus which use the first three or the last three cycles of a segment. These are illustrated by a horizontally-divided box where the first operation appears on the top half and the second operation appears on the bottom half of the box.

In one implementation, read operation on the PMST will occur at the end of the segment and hence can occur in the same segment as a CHR read on which it depends. The four consecutive CHRs are labeled A, B, C, D and the last two are shown in light shaded boxes for clarity. Segments reserved for SBU and Host accesses are shown in darker shaded box. Note that segments 0 to 4 are identical in both schedules.

Metering and Marking Algorithm Processor (MMAP)

In addition to the Main Pipeline, another level of pipelining is used within the MMAP to efficiently utilize complex arithmetic processing components. The Arithmetic pipeline of the MMAP is illustrated in. The MMAP pipeline has 11 cycles available to meter a given CHR using the specified algorithm. Note that in the diagram above, the arithmetic operations are followed by 'D' flops illustrating the pipelining. In the actual implementation, these flops may be moved within the combinational logic during the optimization phases of the synthesis. Also note that the elapsed time calculation is performed in the PMP and in the SMP sub-blocks.

Single Bucket Metering

This algorithm simply uses the pipeline once to determine the result. The pass output determines whether the result is conformant or not and the updated token count is taken from the Net Total if the packet is non-conformant, and from the New Count if the packet is conformant.

Dual-Rate Dual Bucket Metering

This algorithm uses the pipeline twice. As both buckets accumulate tokens independently at possibly different rates, this algorithm will use the pipeline twice to compute the tokens accumulated in each of the two buckets. The algorithmic section of the MMAP will decide how buckets are to be updated based on the result (passed) of the two operations through the pipeline.

As the two bucket operations can be launched once cycle apart, the total number of cycles should be equal to the 8 cycles required to get the first 'pass' signal, plus 1 cycle for the second 'pass signal' plus 2 cycles to compute the result and actions; for a total of 11 cycles.

Single-Rate Dual Bucket Metering

This algorithm also uses the pipeline twice. In this case, the second bucket accumulates tokens based on the excess number of tokens obtained during the update of the first bucket. For this reason, the MMAP pipeline includes a feedback path from the 'excess' result back to the addition computing the 'gross total'.

The algorithmic section of the MMAP will decide how buckets are to be updated based on the result (passed) of the two operations through the pipeline. The computational latency for this algorithm includes the 7 cycles required to compute the excess, plus 2 cycles to compute the pass result of the secondary meter, plus 2 cycles to compute the result and actions; for a total of 11 cycles.

Metering Precision

The implementation of the various metering algorithms rely on an emulation of a continuous-state token bucket model which continuously accumulates tokens over time. As each token is a discrete quantum which is matched to the quantum unit of the packet (one octet); partial tokens are only meaningful as an abstraction representing a certain portion of the elapsed time required for the accumulation of an additional token.

As shown in FIG. 8, the accumulation of accumulated tokens is based on a product of the data rate and the elapsed time. The configured rate of a token bucket expresses the number of tokens that will be accumulated in a given time unit. As the range of the supported data rate is relatively large, the invention according to specific embodiments wishes to limit the number of significant bits in the multiplier and to provide a uniform granularity in the specification of the rate; a floating point representation is chosen to specify the token accumulation rate of a token bucket. For a 9-bit mantissa with an implicit leading '1', the granularity is less than 0.2% of the most significant bit.

As the configured rate may comprise a fractional number of tokens per unit time, the product of the rate and the elapsed time may result in a fractional number of accumulated tokens. In the continuous state model, this fraction would be preserved and accumulated in the token bucket. In practice, it may be impractical to store fractional tokens to the extent required to represent the least significant bit of the product. In order to guarantee that a user will never get less than the configured rate specified in the traffic conditioning agreement, the number of accumulated token in a given elapsed time will be rounded up according to specific embodiments of the present invention to the next integer number of tokens.

7. Embodiment in a Programmed Information Appliance

FIG. 18 is a illustrates an example logic system that according to specific embodiments can be configured to embody aspects of the present invention. As will be understood to practitioners in the art from the teachings provided herein, the invention can be implemented in hardware and/or software. In some embodiments of the invention, different aspects of the invention can be implemented in either client-side logic or server-side logic. As will be understood in the art, the invention or components thereof may be embodied in a fixed media program component containing logic instructions and/or data that when loaded into an appropriately configured computing device cause that device to perform according to the invention. As will be understood in the art, a fixed media containing logic instructions may be delivered to a viewer on a fixed media for physically loading into a viewer's computer or a fixed media containing logic instructions may reside on a remote server that a viewer accesses through a communication medium in order to download a program component.

FIG. 18 shows an information appliance (or digital device) 700 that may be understood as a logical apparatus that can read instructions from media 717 and/or network port 719, which can optionally be connected to server 720 having fixed media 722. Apparatus 700 can thereafter use those instructions to direct server or client logic, as understood in the art, to embody aspects of the invention. One type of logical apparatus that may embody the invention is a computer system as illustrated in 700, containing CPU 707, optional input devices 709 and 711, disk drives 715 and optional monitor 705. Fixed media 717, or fixed media 722 over port 719, may be used to program such a system and may represent a disk-type optical or magnetic media, magnetic tape, solid state dynamic or static memory, etc. In specific embodiments, the invention may be embodied in whole or in part as software recorded on this fixed media. Communication port 719 may also be used to initially receive instructions that are used to program such a system and may represent any type of communication connection.

The invention also may be embodied in whole or in part within the circuitry of an application specific integrated circuit (ASIC) or a programmable logic device (PLD). In such a case, the invention may be embodied in a computer understandable descriptor language, which may be used to create an ASIC, or PLD that operates as herein described.

8. Other Embodiments

Alternate implementations of the invention could use different types of memories (SRAM, DRAM, and other memory types) to implement the various tables. More than one table can be implemented within a single memory device. The whole or part of the MMP can be implemented in software on a programmable computer.

The invention has now been described with reference to specific embodiments. Other embodiments will be apparent to those of skill in the art. In particular, a viewer digital information appliance has generally been illustrated as a personal computer. However, the digital computing device is meant to be any information appliance for interacting with a remote data application, and could include such devices as a digitally enabled television, cell phone, personal digital assistant, etc.

In addition, communication channels have been described primarily as traditional network connections, with the appropriate corresponding hardware. However, channels are meant to be any channels capable of carrying data, including wireless channels, optical channels, and electrical channels.

It is understood that the examples and embodiments described herein are for illustrative purposes and that various modifications or changes in light thereof will be suggested by the teachings herein to persons skilled in the art and are to be included within the spirit and purview of this application and scope of the claims.

All publications, patents, patent applications or other documents cited herein are incorporated by reference in their entirety.

What is claimed is:

1. A metering and marking processor (MMP) telecom system block apparatus comprising:
   a metering processor measuring incoming digital data unit microflow against one or two specified temporal profiles using an at least two-level metering hierarchy;
   a marking function using results of one and/or two metering operations to provide an action instruction for a downstream digital data unit handling device to perform an appropriate action on said corresponding digital data unit:
   an action tag field of a context header record (CHR) specifying said action instruction;
   one or more additional fields of said context header record in which said MMP provides other information for a downstream digital data unit handling device use;
   and further comprising:
   one or more primary digital data unit meters;
   one or more secondary digital data unit meters
   each said primary and secondary digital data unit meters including two token buckets; and
   each said meter configurable to implement a metering algorithm using one or both of its token buckets.

2. The apparatus according to claim 1 further wherein said incoming digital data unit microflows are identified by a flow tag inserted in a context header record (CHR) by an upstream digital data unit handling component.

3. The apparatus according to claim 1 further wherein:
   incoming digital data units are assigned to be metered by a particular primary meter using a flow tag of said incoming digital data units; and
   said incoming digital data units are assigned to be metered by a particular secondary meter using results of an assigned primary meter.

4. The apparatus according to claim 1 further wherein the meters implement token-bucket-oriented metering algorithms and include a plurality of token buckets that can be configured for either plural or single bucket operation and further wherein said MMP implements three metering schemes: Single Rate Dual-Bucket, Two Rate Dual-Bucket, and Single Bucket.

5. A metering and marking digital data unit handling module apparatus comprising:
   a primary meter selector processor;
   a primary metering processor;
   a secondary metering processor;

said primary metering processor and said secondary metering processor providing a two-level metering hierarchy;
said primary metering processor performing microflow metering;
said secondary metering processor performing aggregate metering;
a metering algorithm processor;
a wrapper;
a pipeline and wrapper interface controller;
said primary and secondary metering processors including two token buckets; and
said primary and secondary metering processors configurable to implement a metering algorithm using one or both of its token buckets.

6. The apparatus according to claim 5 further comprising: two pipeline schedules.

7. A method of managing incoming data transmissions comprising:
measuring an incoming digital data unit microflow against two specified temporal profiles using a two-level metering hierarchy; and
based on results of two metering operations, providing an action instruction for a downstream device to perform an appropriate action on said corresponding digital data unit;
wherein said two-level metering hierarchy includes two token buckets; and
wherein said two-level metering hierarchy is configurable to implement a metering algorithm using one or both of its token buckets;
further wherein said action instruction comprises an action code, action data, and an action mask and wherein said action code, said action data and said action mask are configurable by a user;
further wherein said incoming digital data unit microflows are identified by a flow tag inserted in a context header record (CHR) by an upstream component; and
providing said action instruction to said downstream device to perform said appropriate action on said corresponding data unit.

8. The method according to claim 7 further wherein said action data and said action mask can be used by said downstream device to perform a bit-selective modification of a type of service (ToS) field in said digital data unit.

9. The method according to claim 7 further comprising: providing counter selection information for downstream statistics.

10. The method according to claim 7 further comprising:
using primary meters and secondary meters, each meter having at least two token buckets and configured to implement a specific metering algorithm using one or both of its token buckets and wherein said configuring is determined by data stored in a data structure and settable by an external management function.

11. The method according to claim 10 further comprising:
using a floating point number to indicate a bucket rate;
using a fixed point number to indicate a token count;
using a fixed point number to indicate a timestamp;
wherein use of a floating point rate provides a consistent percentage granularity in specification of a rate while reducing memory space needed; wherein said fixed point token count and said timestamp provide byte-based granularity and simplified arithmetic.

12. The method according to claim 11 further wherein said token count is kept for each meter and wherein the result of a multiplication of the rate and elapsed time is always rounded up.

13. The method according to claim 11 further comprising:
setting a saturation flag in meter data structures to perform synchronous background updates.

14. The method according to claim 11 further comprising:
using a synchronous update process to provide a background refresh operation when using dynamic memory to implement meter tables in order to save bandwidth to memory and increase a digital data unit processing rate.

15. The method according to claim 11 further comprising:
using a 4-valued counter selector to provide counting for 6 distinct transitions between input color and conformance result.

16. The method according to claim 7 further wherein a metering structure identifying meters to be used for primary and secondary metering is specified through meter selectors that include a color to be input to a metering algorithm of a given meter.

17. The method according to claim 7 further wherein the action to be performed on a digital data unit based on a conformance level from a metering operation of the one or more metering operations is specified through an action selector.

18. The method according to claim 7 further wherein:
the action to be performed on the digital data unit based on a conformance level from said one or two metering operation is specified through an action selector; wherein said action selector can indicate one of: NO ACTION; DISCARD; REMARK.

19. The method according to claim 18 wherein said action selector further comprises:
a remarking data subfield; and a remarking data mask subfield.

20. The method according to claim 7 further wherein:
the action to be performed on a digital data unit based on a conformance level from a metering operation of the one or more metering operations is specified through an action selector and wherein said action selector can indicate one of a several actions specified by a user.

21. The method according to claim 7 further comprising:
allowing separate actions to be defined for each possible outcome of each of a plurality of primary and secondary meters;
including in a secondary meter action selector a configuration indication to select whether the action to be applied to said digital data unit should be that associated with a primary metering operation or that associated with a secondary metering operation.

22. The method according to claim 21 further wherein said configuration indication further comprises:
a state indicating that a worst action from said primary meter and said secondary meter should be applied to a digital data unit.

23. The method according to claim 7 wherein a further configuration indication allows an action for a given metering result to be skipped if a conformance result corresponds to an input color of the digital data unit.

24. A network digital data unit router comprising:
one or more channel interfaces for sending and receiving digital data units on a data network;
one or more processors for processing said digital data units;
memory for temporarily storing said digital data units while determining processing of said digital data units;
a metering and marking function comprising:
a primary meter selector processor (pmsp);
a primary metering processor (pmp);
a secondary metering processor (smp); and a metering algorithm processor (map) a wrapper; and a pipeline and wrapper interface controller;

said primary metering processor and said secondary metering processor providing a two-level metering hierarchy;

said primary metering processor performing microflow metering;

said secondary metering processor performing aggregate metering;

wherein said two-level metering hierarchy includes two token buckets; and wherein said two-level metering hierarchy is configurable to implement a metering algorithm using one or both of its token buckets.

25. A communications system comprising:

a plurality of routers, at least one router according to claim 24; and a network communication media; and a plurality of interfaces to destinations.

26. A computer readable medium containing computer interpretable instructions that when loaded into an appropriately configuration information processing device will cause said information processing device to embody all the network digital data unit router of claim 24.

27. A method of handling incoming data transmission in a communication system using a two-level metering hierarchy comprising:

performing a first metering operation; and performing a second metering operation;

wherein a second meter identifier is determined by the result of the first metering operation; and wherein an input color to said second metering operation is determined by the result of the first metering operation;

further wherein said first metering operation is performed using one of a large number of primary meters; and said second metering operation is performed using one of a smaller number of secondary meters; and providing results of said second metering operation to a downstream device to perform an appropriate action on the corresponding data transmission.

28. The method according to claim 27 wherein said smaller number of said secondary meters is about half said large number of said primary meters.

29. The method according to claim 27 wherein said smaller number of said secondary meters is about one order of magnitude less than said large number of said primary meters.

30. The method according to claim 27 further comprising:

reading a flow tag for an incoming data unit read from a context header record; and selecting a first meter for said first metering operation using said flow tag.

31. The method according to claim 30 further comprising:

reading an input color for said incoming data unit read from the context header record; and using said input color in said first metering operation.

32. The method according to claim 27 further comprising: said first metering operation outputting an action instruction for a data unit.

33. The method according to claim 32 further wherein said action instruction comprises one or more of:

an action instruction code; action instruction data; and an action instruction mask.

34. The method according to claim 32 further comprising:

storing said action instruction in a record for said data so that a downstream component can read said action instruction to perform an appropriate action on said data unit.

35. The method according to claim 27 further comprising:

said second metering operation outputting an action instruction for a data unit.

36. The method according to claim 27 further comprising:

at said first metering operation, determining a color for an incoming digital data unit: based on said color, selecting a second level meter from metering identifications stored in association with said first meter.

37. The method according to claim 36 further wherein:

if the first metering operation yields GREEN, selecting a first of said second level meter;

if the first metering operation yields YELLOW, selecting a second of said second level meter;

if the first metering operation yields RED, selecting a third of said second level meter.

38. The method according to claim 36 further comprising:

selecting a primary meter selector, comprising a pointer to a primary meter and a first input color code, based on a flow tag;

performing primary metering using a primary meter and first input color; selecting a secondary meter selector, comprising a pointer to a secondary meter and a second input color code, based on the primary metering result; and performing the secondary metering using the secondary meter and the second input color.

39. The method according to claim 27 further wherein:

said first level metering is performed on a fine grain and said second level metering is performed on a coarse grain.

40. The method according to claim 27 further comprising:

providing said two-level metering hierarchy in an internet protocol digital data unit handling device, wherein said two-level metering provides microflow handling at a consumer edge of a network system and aggregate marking to allowing data to be handled as aggregate data in the core of the network system.

* * * * *

UNITED STATES PATENT AND TRADEMARK OFFICE
CERTIFICATE OF CORRECTION

PATENT NO. : 7,664,028 B1  Page 1 of 1
APPLICATION NO. : 10/093092
DATED : February 16, 2010
INVENTOR(S) : Gingras et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2042 days.

Signed and Sealed this

Twenty-eighth Day of December, 2010

David J. Kappos
*Director of the United States Patent and Trademark Office*